US009856354B2

(12) United States Patent
Miwa et al.

(10) Patent No.: US 9,856,354 B2
(45) Date of Patent: Jan. 2, 2018

(54) EPOXY RESIN COMPOSITION AND PREPREG USING THE SAME, FIBER-REINFORCED COMPOSITE RESIN TUBULAR BODY MANUFACTURED FROM THE PREPREG AND MANUFACTURING METHOD THEREFOR, AND FIBER-REINFORCED COMPOSITE RESIN MOLDED BODY

(75) Inventors: Youhei Miwa, Toyohashi (JP);
Tadayoshi Saitou, Toyohashi (JP);
Masato Taguchi, Toyohashi (JP);
Mikihiro Uchizono, Toyohashi (JP);
Tetsuya Atsumi, Toyohashi (JP);
Tsutomu Ibuki, Toyohashi (JP)

(73) Assignees: MITSUBISHI CHEMICAL CORPORATION, Tokyo (JP); MRC COMPOSITE PRODUCTS CO., LTD., Toyohashi-shi (JP)

(*) Notice: Subject to any disclaimer, the term of this patent is extended or adjusted under 35 U.S.C. 154(b) by 0 days.

(21) Appl. No.: 13/058,987

(22) PCT Filed: Aug. 27, 2009

(86) PCT No.: PCT/JP2009/004163
§ 371 (c)(1),
(2), (4) Date: Feb. 14, 2011

(87) PCT Pub. No.: WO2010/023918
PCT Pub. Date: Mar. 4, 2010

(65) Prior Publication Data
US 2011/0143856 A1 Jun. 16, 2011

(30) Foreign Application Priority Data

Aug. 28, 2008 (JP) ................................ 2008-219535

(51) Int. Cl.
B29C 53/82 (2006.01)
B32B 1/08 (2006.01)
(Continued)

(52) U.S. Cl.
CPC ................ *C08J 5/24* (2013.01); *C08G 59/46* (2013.01); *C08G 59/504* (2013.01); *C08J 2363/00* (2013.01); *Y10T 428/139* (2015.01)

(58) Field of Classification Search
CPC .......... C08G 59/40; C08G 59/504; C08J 5/24; C08J 2363/00; Y10T 428/139
(Continued)

(56) References Cited

U.S. PATENT DOCUMENTS 6,046,257 A    4/2000   Oosedo et al. ................ 523/428
2006/0035088 A1   2/2006   Takano et al. ................ 428/413
(Continued)

FOREIGN PATENT DOCUMENTS

CN    101218286 A    7/2008
EP    1914266    *  4/2008
(Continued)

OTHER PUBLICATIONS

English translation of JP 2007-169312, Jul. 2007.*
(Continued)

*Primary Examiner* — Camie S Thompson
(74) *Attorney, Agent, or Firm* — Oblon, McClelland, Maier & Neustadt, L.L.P.

(57) ABSTRACT

By completing curing in a short period of time even at low temperatures and using an epoxy resin composition as a matrix resin of a prepreg, it is possible to obtain a fiber-reinforced composite plastic product such as a fiber-reinforced tubular composite with excellent mechanical properties and, more particularly, excellent impact resistance. The epoxy resin composition includes A component, B component, C component, D component and E component, where the content rate of sulfur atoms is equal to or more than 0.2 wt % and equal to or less than 7 wt %, and the content rate of the C component is equal to or more than 1 wt % and (Continued)

equal to or less than 15 wt %. A component: epoxy resins, B component: reactive products of the epoxy resins and an amine compounds including the sulfur atom in a molecule (the unreacted epoxy resins and/or the amine compounds may be included), C component: polyamide compounds soluble in the A component, D component: urea compounds, and E component: dicyandiamide.

18 Claims, 3 Drawing Sheets

(51) Int. Cl.
  *C08J 5/24* (2006.01)
  *C08G 59/46* (2006.01)
  *C08G 59/50* (2006.01)

(58) Field of Classification Search
  USPC .......................................... 428/36.9; 156/175
  See application file for complete search history.

(56) References Cited

U.S. PATENT DOCUMENTS

| | | | |
|---|---|---|---|
| 2008/0185753 A1 | 8/2008 | Takano et al. | 264/239 |
| 2008/0185757 A1 | 8/2008 | Takano et al. | 264/319 |
| 2008/0187718 A1 | 8/2008 | Takano et al. | 428/147 |
| 2009/0111924 A1* | 4/2009 | Ito et al. | 524/384 |
| 2009/0202832 A1 | 8/2009 | Takano et al. | 428/392 |

FOREIGN PATENT DOCUMENTS

| | | | |
|---|---|---|---|
| JP | 59 174616 | | 10/1984 |
| JP | 6 166765 | | 6/1994 |
| JP | 8 337707 | | 12/1996 |
| JP | 3539603 | | 7/2004 |
| JP | 3796953 | | 7/2006 |
| JP | 2007169312 | | 7/2007 |
| JP | 2009-079073 | * | 4/2009 |
| JP | 2013-159695 | | 8/2013 |
| WO | 96 02592 | | 2/1996 |
| WO | 2004 048435 | | 6/2004 |

OTHER PUBLICATIONS

International Search Report dated Oct. 27 in PCT/JP09/004163 filed Aug. 27, 2009.
Taiwanese Office Action dated Sep. 20, 2012 in Patent Application No. 098128895 with English Translation.
Notification of Reexamination as received in the corresponding Chinese Patent Application No. 200980133160.0 dated Sep. 11, 2014 w/English Translation.
Ping Chen, et al., "Epoxy Resins and Use Thereof", First Version, Feb. 2004, pp. 150-151 w/English Translation.
Notice of Allowance as received in the corresponding Chinese Patent Application No. 200980133160.0 dated May 5, 2015 w/English Translation.
Notice of Allowance as received in the corresponding Japanese Patent Application No. 2009-542283 dated Jun. 10, 2014 w/English Translation.

* cited by examiner

EPOXY RESIN COMPOSITION AND PREPREG USING THE SAME, FIBER-REINFORCED COMPOSITE RESIN TUBULAR BODY MANUFACTURED FROM THE PREPREG AND MANUFACTURING METHOD THEREFOR, AND FIBER-REINFORCED COMPOSITE RESIN MOLDED BODY

TECHNICAL FIELD

The present invention relates to a fiber-reinforced tubular composite used in sports and leisure goods, in industrial products or the like, a fiber-reinforced composite plastic product including the same, a method of manufacturing the fiber-reinforced composite plastic product, prepreg used in the fiber-reinforced composite plastic product, and an epoxy resin composition suitably used in the prepreg.

Priority is claimed on Japanese Patent Application No. 2008-219535, filed Aug. 28, 2008, the content of which is incorporated herein by reference.

BACKGROUND ART

A fiber-reinforced composite plastic product, which is one of fiber-reinforced composite materials, has been widely used in sports and leisure goods and in industrial products such as vehicles or aircrafts, due to its light weight, high mechanical strength and high rigidity.

Among fiber-reinforced composite plastic product s, a fiber-reinforced tubular composite is, for example, used in sports and leisure goods such as fishing poles, shafts for golf clubs, ski poles, and bicycle frames.

Examples of a method of manufacturing a fiber-reinforced composite plastic product include a method of using an intermediate material obtained by impregnating a matrix resin in reinforcements such as long fiber reinforcements, that is, prepreg. According to this method, it is easy to manage the content of the reinforcement fiber in the fiber-reinforced composite plastic product and it is possible to set the content to be high.

Examples of a detailed method of obtaining the fiber-reinforced composite plastic product from prepreg include a method of using an autoclave, a press molding, and the like. In order to cure the prepreg by these methods, a heating treatment of about 1 hour is required. If the time of the rising and falling of temperature is also included, under a general processing condition, a long period of time such as about 2 to 6 hours is required for one molding and thus molding costs are increased. Meanwhile, for the mass production of a product, molding needs to be performed at a relatively low temperature of about 100 to 150° C. over a short period of time such as several minutes to several tens of minutes.

One of the methods of performing molding in a short period of time is using an epoxy resin composition which has high reaction activity and a curing reaction which starts at a low thermal energy as a matrix resin. This method can shorten the curing time for the epoxy resin composition.

However, if reaction activity is excessively high, the curing reaction progresses even during storage at room temperature and storage stability deteriorates. In addition, since cross-linking density is increased, the obtained cured material is fragile and, in particular, is inferior to impact resistance.

With such background circumstances, there is a need for an epoxy resin composition, which can be completely cured in a short period of time even at low temperatures and uses as prepreg matrix resin, able to manufacture a fiber-reinforced composite plastic product with excellent mechanical properties and, more particularly, excellent impact resistance (toughness).

As prepreg which can be molded at relatively low temperatures in a short period of time, Patent Document 1 discloses prepreg which uses an epoxy resin composition, with polyvinyl formal as a thermoplastic resin elastomer, as a matrix resin, and uses dicyandiamide as a latent hardener. In addition, Patent Document 2 discloses prepreg consists of epoxy resin composition including a reactive product of an epoxy resin and an amine compound including a sulfur atom in its molecule.

In addition, as a method of improving impact resistance of a cured material, many methods are reported which use an epoxy resin composition including a thermoplastic resin. For example, Patent Documents 3 and 4 suggest the use of an epoxy resin composition containing a polyamide-based thermoplastic elastomer.

[Patent Document 1] Japanese Patent Publication No. 3796953

[Patent Document 2] International Publication No. 2004/048435

[Patent Document 3] Japanese Unexamined Patent Publication No. 8-337707

[Patent Document 4] Japanese Patent Publication No. 3539603

DISCLOSURE OF THE INVENTION

Problems to be Solved by the Invention

However, in the prepreg disclosed in Patent Document 1, a gelling time at 130° C. is still too long and the impact resistance of the cured material is also not sufficient. In the prepreg disclosed in Patent Document 2, a sufficient curing property is obtained at low temperatures, but the impact resistance of a cured material is insufficient.

In the technology of Patent Documents 3 and 4, a curing time of 2 hours at 135° C. is required and does not meet for the above-described requirements.

The present invention can solve the above-described problems. An object of the present invention is to provide an epoxy resin composition which can cure in a short period of time even at low temperatures, prepreg using the same, a fiber-reinforced composite plastic product using the prepreg, a fiber-reinforced tubular composite, and a method of manufacturing them.

Means for Solving the Problems

The present inventors found that, in an epoxy resin composition satisfying the following conditions, curing is completed in a short period of time even at low temperatures, compared with known epoxy resin compositions, and, if this epoxy resin composition is used as a matrix resin of the prepreg, it is possible to obtain a fiber-reinforced composite plastic product with excellent mechanical properties and, more particularly, excellent impact resistance.

The epoxy resin composition of the present invention includes A components, B components, C components, D components and E components, the content rate of sulfur atoms is equal to or more than 0.2 wt % and equal to or less than 7 wt %, and the content rate of the C component is equal to or more than 1 wt % and equal to or less than 15 wt %.

A component: epoxy resins

B component: reactive products of the epoxy resins and amine compounds including the sulfur atom in its molecule (the unreacted epoxy resins and/or the amine compounds may be included)

C component: polyamide compounds soluble in the A component

D component: urea compounds

E component: dicyandiamide

The C component may be a block copolymer expressed by Formula 1.

[Formula 1]

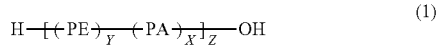

(1)

(In Formula 1, PE denotes a polyetherester skeleton, and PA denotes a polyamide skeleton. In addition, X=1 to 10, Y=1 to 10, and Z=1 to 20, all of which are integers.)

The polyamide skeleton may be derived from a polymeric fatty acid.

The polyamide skeleton may be expressed by Formula 2, and the polyetherester skeleton may be expressed by Formula 5.

[Formula 2]

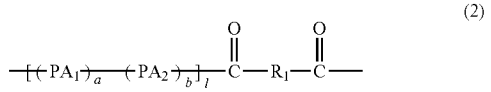

(2)

(In Formula 2, a=0 to 2, b=0 to 2, l=1 to 10, all of which are integers. In addition, a and b cannot simultaneously be 0. $R_1$ is —$(CH_2)_\alpha$— ($\alpha$ is an integer equal to or greater than 2 and equal to or smaller than 40). In addition, $PA_1$ and $PA_2$ are independently expressed by Formula 3 or 4.)

[Formula 3]

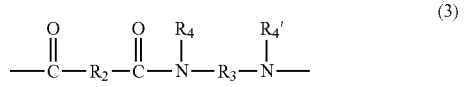

(3)

[Formula 4]

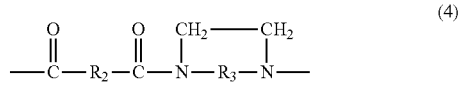

(4)

(In Formulas 3 and 4, $R_2$ is —$(CH_2)_\beta$— ($\beta$ is an integer equal to or greater than 2 and equal to or smaller than 40). $R_3$ is —$(CH_2)_d$— (d is an integer equal to or greater than 1 and equal to or smaller than 6). In addition, $R_4$ and $R_4'$ are independently H or $CH_3$.)

[Formula 5]

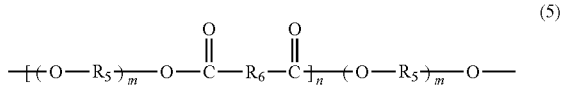

(5)

(In Formula 5, m is an integer equal to or greater than 3 and equal to or smaller than 20, and n is an integer equal to or greater than 1 and equal to or smaller than 10. In addition, $R_5$ is —$(CH_2)_e$— (e is an integer equal to or greater than 2 and equal to or smaller than 8). $R_6$ is —$(CH_2)_\gamma$— ($\gamma$ is an integer equal to or greater than 2 and equal to or smaller than 40.))

A prepreg of the present invention is prepreg in which the epoxy resin composition is impregnated in a reinforcement fiber.

A fiber-reinforced composite plastic product uses the prepreg of the present invention.

A fiber-reinforced tubular composite made of the prepreg of the present invention.

As the fiber-reinforced tubular composite, a golf club shaft may be exemplified.

A method of manufacturing a fiber-reinforced tubular composite includes winding the prepreg on a mandrel, curing the epoxy resin composition, and separating the mandrel and the fiber-reinforced tubular composite, wherein the curing temperature of the is equal to or higher than 80° C. and equal to or lower than 150° C. and the treatment process of the curing is equal to or more than 5 minutes and equal to or less than 90 minutes.

Effects of the Invention

According to the present invention, it is possible to provide an epoxy resin composition which can be cured in a short period of time even at low temperatures; prepreg consists of the epoxy resin composition, a fiber-reinforced composite plastic product including a fiber-reinforced tubular composite with excellent mechanical properties and, more particularly, excellent impact resistance, and a method of manufacturing a fiber-reinforced tubular composite.

BEST MODE FOR CARRYING OUT THE INVENTION

Figure 1:
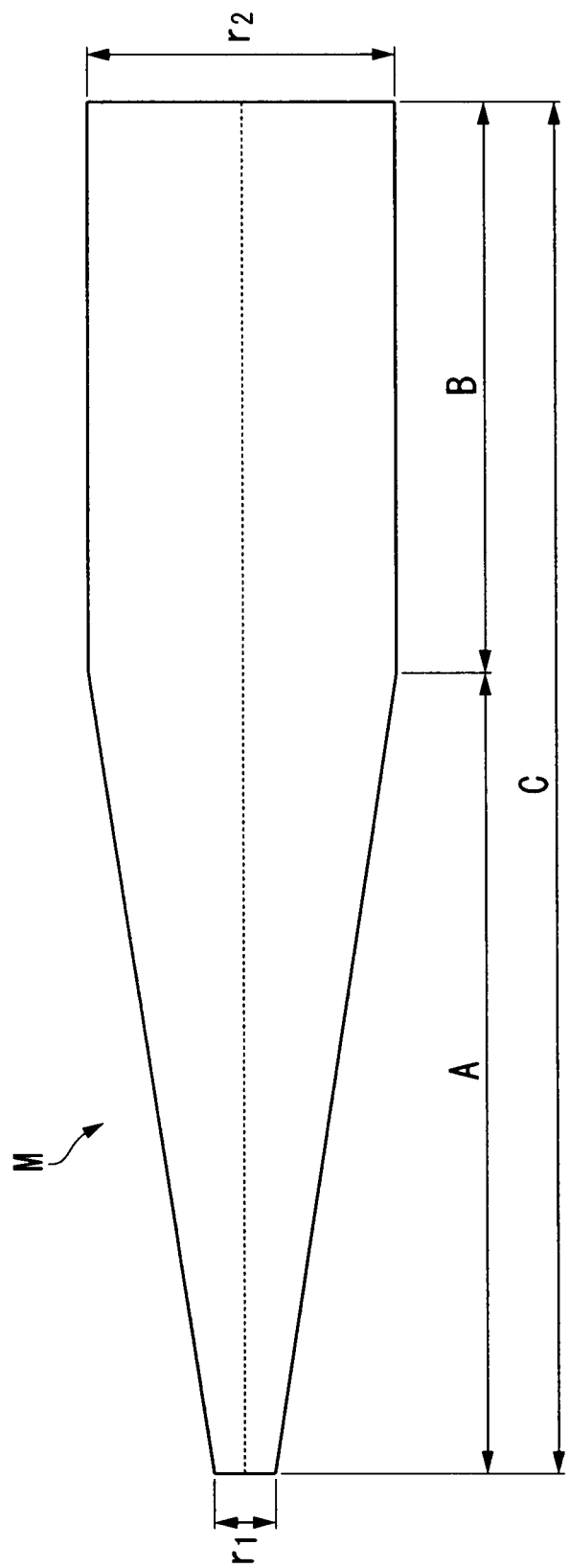
FIG. 1 is a plan view of a mandrel used for manufacturing a golf club shaft.

Hereinafter, an embodiment of the present invention will be described.

[Epoxy Resin Composition]

(A Component)

In the present invention, examples of an epoxy resin used as an A component include a bisphenol A-type epoxy resin, a bisphenol F-type epoxy resin, a biphenyl-type epoxy resin, a dicyclopentadiene-type epoxy resin, and an epoxy resin obtained by modifying them as a difunctional epoxy resin. Examples of a trifunctional or higher polyfunctional epoxy resin include, but are not limited to, a phenol novolak epoxy resin, a cresol epoxy resin, a glycidylamine epoxy resin including tetraglycidyldiaminodiphenylmethane, triglycidyl aminophenol and tetraglycidylamine, a glycidylether epoxy resin including tetrakis(glycidyloxyphenyl)ethane and tris (glycidyloxy)methane, an epoxy resin obtained by modifying these epoxy resins, and a brominated epoxy resin obtained by brominating these epoxy resin. As the A component, a combination of two or more of the above-described epoxy resins may be used.

Among them, particularly, the bisphenol A-type epoxy resin, the bisphenol F-type epoxy resin, a bisphenol S-type epoxy resin, the phenol novolak epoxy resin, and a cresol novolak epoxy resin are suitably used. If these epoxy resins are used, the mechanical strength of the molding is further improved, compared with the case where an epoxy resin with high rigidity, such as an epoxy resin with a naphthalene skeleton in a molecule, is used. This is because there is hardly any distortion due to an increase in cross-linking density even when these epoxy resins are cured in a short period of time.

(B Component)

B component used in the present invention is a reactive product obtained by the reaction between at least portions of an epoxy resin and an amine compound having at least one sulfur atom in its molecule. The epoxy resin and the amine compound may at least partially react, and a non-reactive epoxy resin and/or amine compound may be left in the reactive product. An epoxy resin composition obtained by blending such a reactive product has a short gelling time and thus can be completely cured in a short period of time even at low temperatures. In addition, it is possible to improve the storage stability of the epoxy resin composition, compared with the case where a simple mixture in which the epoxy resin and the amine compound do not react to each other.

As the epoxy resin used in the B component, the various epoxy resins first exemplified as the A component may be used. The epoxy resin used as the B component may be the same as or different to that used as the A component.

As the amine compound having at least one sulfur atom in its molecule, 4,4'-diaminodiphenyl sulfone, 3,3'-diaminodiphenyl sulfone, 4,4'-diaminodiphenyl sulfide, bis(4-(4-aminophenoxy)phenyl)sulfone, bis(4-(3-aminophenoxy)phenyl)sulfone, 4'4-diaminodiphenyl sulfide, o-trian sulfone, and a derivative thereof are preferably used, and one or more type thereof may be used.

As a method of making reaction of the epoxy resin and the amine compound having at least one sulfur atom in the molecule to react to each other, is a method of mixing the epoxy resin and the amine compound at room temperature and performing a heating treatment at about 130 to 200° C. At this time, in the mixing ratio of the amine compound to the epoxy resin, an equivalent ratio of the amine compound to the epoxy equivalent of the epoxy resin is preferably equal to or more than of 3% and equal to or less than 60% and is more preferably equal to or more than 10% and equal to or less than 20%. If the ratio is equal to or more than the lower limit, a curing property is further improved and curing can be performed in a short period of time. On the other hand, if the ratio is equal to or less than the upper limit, the viscosity of the reactive product is not excessively high and thus may be sufficiently mixed with other components.

When the epoxy resin and the amine compound having at least one sulfur atom in its molecule react to each other, the viscosity of the reactive product at 90° C. is preferably equal to or more than 1 Poise and equal to or less than 1000 Poise and is more preferably equal to or more than 10 Poise and equal to or less than 200 Poise. If the viscosity is within the above-described range, the prepreg manufactured as the epoxy resin composition will be easy to handle.

(C Component)

C component used in the present invention refers to a polyamide compound which is soluble in the epoxy resin of the A component and a polyamide compound which is dissolved by 1 wt % or more in the A component after being heated and dissolved at 180° C. for 6 hours.

As such a polyamide compound, a polyester-amide copolymer is suitably used. In detail, a polyamide resin derived from a polymeric fatty acid consisting mainly of a dimer acid (dimerized fatty acid) of a fatty acid is preferable. As such a polymeric fatty acid-based polyamide resin, for example, PA series (PA-100, PA-100 A, PA-102 A, PA-105 A) (manufactured by Fuji Kasei Kogyo Co., Ltd.,) may be exemplified.

Such a polymeric fatty acid-based polyamide resin and a polyamide elastomer (a polyetheresteramide block copolymer or a polyesteramide copolymer or the like) obtained by copolymerization with polyethers, polyesters, polyetheresters or the like are suitably used.

In addition, as the C component, a polyetheresteramide (polyetheresteramide block copolymer) expressed by Formula 1 may be suitably used.

This polyetheresteramide is a polymer having a polyamide component, and an amide bond, an ether bond and an ester bond in its molecular chain, which are obtained from the reaction of a polyetherester component made of a polyoxyalkylene glycol and a dicarboxylic acid. Since this polyetheresteramide has a high compatibility with an epoxy resin, it is possible to form a fine sea-island structure with the epoxy resin. As a result, in an epoxy resin composition or a fiber-reinforced composite plastic product using the same, it is possible to improve impact resistance while maintaining excellent mechanical strength.

In Formula 1, as a suitable example of a polyamide skeleton expressed by PA, the above-described polymeric fatty acid-based polyamide resin is used.

In addition, the PA of Formula 1 is expressed by in Formula 2, and PE may suitably use a polyamide compound expressed by Formula 5.

In Formula 2, $PA_1$ and $PA_2$ are independently expressed by Formula 3 or 4. That is, in $PA_1$ and $PA_2$, there are a single structure of Formula 3, a single structure of Formula 4 and a mixture of the structure of Formula 3 and the structure of Formula 4.

In Formula 1, X is equal to or greater than 1 and equal to or smaller than 10, Y is equal to or greater than 1 and equal to or smaller than 10, and Z is equal to or greater than 1 and equal to or smaller than 20, all of which are integers. In Formula 2, a is equal to or greater than 0 and equal to or smaller than 2, b is equal to or greater than 0 and equal to or smaller than 2, and 1 is equal to or greater than 1 and equal to or smaller than 10, all of which are integers. In addition, a and b cannot simultaneously be 0, and a+b is equal to or more than 1. In addition, $R_1$ is $-(CH_2)_\alpha-$ ($\alpha$ is an integer equal to or greater than 2 and equal to or smaller than 40).

In Formulas 3 and 4, $R_2$ is $-(CH_2)_\beta-$ ($\beta$ is an integer equal to or greater than 2 and equal to or smaller than 40). $R_3$ is $-(CH_2)_d-$ (d is an integer equal to or greater than 1 and equal to or smaller than 6). In addition, $R_4$ and $R_4'$ are independently H or $CH_3$.

In Formula 5, m and n are an integer equal to or greater than 3 and equal to or smaller than 20 and an integer equal to or greater than 1 and equal to or smaller than 10, respectively. In addition, $R_5$ is $-(CH_2)_e-$ (e is an integer equal to or greater than 2 and equal to or smaller than 8). $R_6$ is $-(CH_2)_\gamma-$ ($\gamma$ is an integer equal to or greater than 2 and equal to or smaller than 40).

As a method of manufacturing the polyetheresteramide, any method may be used if polymer with a uniform high molecular weight is obtained. For example, there is a method of first synthesizing a polyamide oligomer, adding a polyoxyalkylene glycol and a dicarboxylic acid thereto, and performing heating treatment under reduced pressure which gives a higher degree of polymerization.

As such a polyetheresteramide, a commercially available product may be used. As the commercialized product of the polyetheresteramide, there are TPAE series (TPAE12, TPAE31, TPAE32, TPAE38, TPAE8, TPAE10, TPAE100, TPAE23, TPAE63, TPAE200, TPAE201, and TPAE260) (manufactured by Fuji Kasei Kogyo Co., Ltd.,). Among them, TPAE32 is a mixture of compounds expressed by Formula 1. The averages of the symbols of Formulas 1 to 5 are X=Y=1, Z=7.26, a=0.16, b=0.84, 1=2.23, $\alpha$=10, $\beta$=34, d=2, m=14, n=1, $\gamma$=10, and e=4. Both $R_4$ and $R_4'$ are H. In addition, in TPAE32, both $PA_1$ and $PA_2$ have a state in which the structure of Formula 3 and the structure of Formula 4 are mixed.

(D Component)

A D component functions as a curing accelerator and is not specially limited if it is a urea compound. For example, a urea compound such as a dichlorodimethyl urea or a phenyldimethyl urea is suitably used. Among them, it is preferable to suitably use a compound which does not have halogen in its molecule, has a high reaction property and low toxicity.

As the D component, a diamide of a carbonic acid or an amide of a carbamic acid may be used. These are generally obtained by affecting amines such as ammonia to phosgene, chloroformic ester, carbamoyl chloride, carbonic acid ester, isocyanate, cyanic acid or the like. A compound which is generally called urea, such as an acyl urea (ureido) obtained by affecting an acyl chloride to a urea or an alkyl urea (urein) obtained by replacing a hydrogen of a urea with a hydrocarbon group, may be used in the D component.

In addition, as the D component, a so-called urea adduct may be used. The urea adduct is obtained by involving a hydrocarbon in a crystal structure of a urea, which is obtained by mixing a hydrocarbon and a saturated solution of a lower alcohol such as a methanol or an aqueous solution of a urea.

If a solid is used as the D component, the average diameter thereof is equal to or smaller than 150 µm or and preferably equal to or smaller than 50 µm. If the average diameter is equal to or smaller than 150 µm, the particle dispersion rate and the curing reaction rate can be maintained within allowable ranges. If the average diameter is equal to or smaller than 50 µm, it is possible to more efficiently achieve curing in a short period of time, which is a most important advantage of this invention.

(E Component)

An E component of the present invention is a dicyandiamide. This dicyandiamide functions as a curing agent of an epoxy resin, and a combination thereof with the other components of the present invention is used such that curing at relatively low temperatures can be achieved.

(Other Additives)

In the epoxy resin composition of the present invention, as any component, a suitable amount of a mineral particulate such as a silica having a fine powder shape, a pigment, an elastomer, a flame retardants (an aluminum hydroxide or a bromide, a phosphorus compound), a defoaming agent, a thermoplastic resin, such as a polyvinyl acetal resin or a phenoxy resin, which has the effect of improving the ease of handling and flexibility and is dissolved in an epoxy resin, an imidazole derivative which is a catalyst of curing reaction, a metal complex salt or a tertiary amine compound may be added.

(Epoxy Resin Composition)

The epoxy resin composition of the present invention may be manufactured by mixing the A component to the E component and an additive added as necessary. In detail, it may be manufactured by mixing an epoxy resin and an amine compound at room temperature, performing a heating treatment, and allowing at least portions thereof to react to each other so as to obtain a reactive product (B component), followed by mixing this B component, the A component, the C component, the D component, and the E component obtain a substantially uniformized state.

At this time, the content rate of the B component is determined such that the content rate of the sulfur atom in the epoxy resin composition becomes equal to or greater than 0.2 and equal to or smaller than 7 wt %, and the content rate of the sulfur atom is preferably equal to or greater than 0.2 and equal to or smaller than 3 wt % and more preferably equal to or grater than 0.2 and equal to or smaller than 0.6 wt %. If the content rate of the sulfur atom is less than the above-described range, it is difficult to complete curing in a short period of time at low temperatures. If the content rate of the sulfur atom is more than the above-described range, the duration of use of the prepreg using the same may be reduced.

Here, the content rate of the sulfur atom is the content rate in a 100% epoxy resin composition which also includes a sulfur atom in a component, if the component containing the sulfur atom is present in addition to the B component.

The content rate of the C component is equal to or more than 1 wt % and equal to or less than 15 wt %. If the content rate of the C component is less than 1%, the impact resistance of a fiber-reinforced composite plastic product using this epoxy resin composition deteriorates and, if the content rate of the C component exceeds 15%, the curing property of this epoxy resin composition deteriorates. The content rate of the C component is preferably equal to or more than 2 wt % and equal to or less than 10 wt % and preferably equal to or more than 2 wt % and equal to or less than 6 wt %. If the content rate of the C component is within the preferable range, the compatibility between the impact resistance and the curing property, which are the advantages of the present invention, produces more remarkable effects.

If the content rate of the B component is equal to or more than 0.2 wt % and equal to or less than 0.6 wt % and the content rate of the C component is equal to or more than 2 wt % and equal to or less than 6 wt %, the suitable viscosity of the epoxy resin composition for making prepreg is achieved.

The content rates of the other components in the epoxy resin compositions are not specially limited, but the A component is preferably equal to or more than 10 wt % and equal to or less than 90 wt % and more preferably equal to or more than 30 wt % and equal to or less than 90 wt %. In such a range, the prepreg using this epoxy resin composition as a matrix resin is easy to handle.

If the content rate of the D component is equal to or more than 1 wt % and equal to or less than 15 wt % in the epoxy resin composition, the prepreg obtained therefrom is allowable in terms of practical application. If the content rate of the D component is equal to or more than 3%, the curing reaction of the epoxy resin composition can be sufficiently performed. If the content rate of the D component is 12 wt % or less, the epoxy resin composition can be stored at near room temperature for a long period of time and thus an usable duration (shelf life) can be increased.

The content rate of the E component is preferably equal to or more than 0.1 wt % and equal to or less than 10 wt % in the epoxy resin composition. Within such a range, the epoxy resin composition is more easily cured at relatively low temperatures. In addition, if the average diameter of the E component is equal to or smaller than 150 μm and more particularly equal to or smaller than 50 μm, dispersibility is good and the contact area is increased. Thus, the reaction rate is preferably increased.

In the manufacture of the epoxy resin composition, the temperature, when the A component to the E component and the additives added as necessary are mixed, is preferably equal to or higher than 50° C. and equal to or lower than 180° C. and more preferably equal to or higher than 60° C. and equal to or lower than 160° C.

The viscosity of the epoxy resin composition is preferably equal to or greater than 200 Poise and equal to or less than 300,000 Poise at 60° C. If the viscosity is equal to or more than the lower limit, in the prepreg using this epoxy resin composition as the matrix resin, tackiness at near room temperature is in an allowable range. If the viscosity is equal to or less than the upper limit, the drapability and the molding property of the prepreg is in suitable ranges. The viscosity range at 60° C. is preferably equal to or more than 400 Poise and equal to or less than 10,000 Poise. The viscosity range at 90° C. is preferably equal to or greater than 5 Poise and equal to or less than 30,000 Poise. If the viscosity is within this range, the flowability of the epoxy resin composition during heating and molding the prepreg is in an allowable range and the desired shape and resin content rate can be maintained. The viscosity range at 90° C. is preferably equal to or greater than 10 Poise and equal to or less than 500 Poise.

In such an epoxy resin composition, curing is completed in a short period of time even at low temperatures and a sufficient usable duration can be secured even for storage at room temperature, compared with the existing epoxy resin composition. In detail, in the epoxy resin composition of the present invention, the gelling time at 130° C. is 200 seconds or less. Here, the gelling time refers to the time necessary for gelling when a specific temperature is applied to a non-cured epoxy resin composition, that is, the time required until the epoxy resin composition forms a three-dimensional mesh structure between molecules and flowability is lost. By using the epoxy resin composition with such a gelling time as the matrix resin for the prepreg, curing can be performed in a particularly short period of time.

[Prepreg]

By impregnating the above-described epoxy resin composition as the matrix resin in a reinforcement fiber, it is possible to obtain prepreg which can be cured in a short period of time at relatively low temperatures. The manufacture of the prepreg can be performed by the known apparatus and manufacturing method.

As the reinforcement fiber, various fibers such as carbon fiber, organic fiber and inorganic fiber may be used according to the purpose of use of the composite resin, but is not limited thereto. For example, carbon fiber, graphitic fiber, aramid fiber, silicon carbide fiber, alumina fiber, boron fiber, glass fiber, silicon nitride fiber, nylon fiber or the like may be preferably used. In addition, a combination of a plurality of reinforcement fibers may be used.

Among these reinforcement fibers, carbon fiber or graphitic fiber has good specific modulus and has a significant effect in reducing weight, and thus is suitable for sports and leisure goods such as fishing poles, shafts for golf clubs and industrial products such as vehicles or aircraft. Either carbon fiber or graphitic fiber may be used according to the use thereof and a fiber having tension strength of 3500 Mpa or more and a modulus of elongation of 190 GPa or more is particularly preferable.

The shape of the reinforcement fiber in the prepreg is not specially limited, but a shape in which reinforcement fibers are aligned uni-directionally, a woven shape, an unwoven fabric shape using reinforcement fiber, which is cut into a short length, and a combination of these shapes may be used. In particular, in the shape in which the reinforcement fibers are aligned uni-directionally or the woven shape, if the prepreg is manufactured using the known epoxy resin composition, the resin flows in a mold and overflows the mold while the viscosity of the resin is decreased and the resin is then cured and thus the content rate of the fiber may not be the same as the designed value. At this time, the mechanical properties of the obtained molding may be damaged or a fiber-reinforced composite plastic product with good appearance may not be obtained. In contrast, if the epoxy resin composition of the present invention is used, since the epoxy resin composition is cured in a short period of time, a fiber-reinforced composite plastic product with good mechanical properties and good appearance is obtained.

By forming reinforcement fibers with long fiber, short fiber, a fabric shape, a mat shape or the like and regularly or irregularly arranging any one or a combination of these reinforcement fibers with these shapes in the matrix resin, impact resistance and vibration attenuation characteristics or the like may be improved.

[Fiber-Reinforced Composite Plastic Product]

By heating and molding the prepreg, a fiber-reinforced composite plastic product is obtained.

Among fiber-reinforced composite plastic product s, for example, a fiber-reinforced tubular composite such as a fishing pole, a golf club shaft, a ski pole, a bicycle frame or the like can be easily manufactured if the prepreg is used.

In detail, the fiber-reinforced tubular composite can be manufactured by winding a prepreg on a mandrel, curing an epoxy resin composition in the prepreg, and separating the mandrel and the fiber-reinforced tubular composite. In more detail, a method is preferable where a desired number of layers of prepreg configured from an angle layer or a straight layer or laminated prepreg are wound on the whole length or a portion of the mandrel, the prepreg is fixed by a tape such as a polypropylene as necessary, and the epoxy resin composition is cured and molded by heating and pressurized processes. At this time, as the molding method, a compression molding method using a metallic mold or the like, an autoclave molding method, a vacuum bag molding method, a tape wrapping molding method, a sheet wrapping method or the like may be used. After molding, the mandrel is separated and the tape is peeled if the tape has been wrapped, thereby obtaining the fiber-reinforced tubular composite.

The obtained fiber-reinforced tubular composite may be polished in order to eliminate irregularities in the appearance or obtain desired rigidity, or may be cut into a desired length, or the outer surface thereof may be coated.

In the curing temperature and the treatment time of the manufacturing method of the present invention, the temperature is equal to or higher than 80° C. and equal to or lower than 150° C. and the treatment time is equal to or higher than 5 minutes and equal to or lower than 90 minutes. If the curing temperature is 80° C. or higher, the curing reaction appropriately progresses and, if the curing temperature is 150° C. or lower, a preferable chemical structure is formed without excessive heating. If the treatment time is 5 minutes or more, heat is widely distributed in the entire molding and thus curing reaction sufficiently progresses. If the treatment time is 90 minutes or less, the molding cycle can be shortened.

Since the fiber-reinforced composite plastic product such as the obtained fiber-reinforced tubular composite made from the prepreg consists of the above-described epoxy resin composition as the matrix resin, excellent mechanical properties and more particularly impact resistance are obtained.

EXAMPLES

Hereinafter, the examples of the present invention will be described in detail.

In the present examples and comparative examples, the following abbreviations were used. The average diameter is a value measured by a laser differential scattering method.
<Epoxy Resin>
jER828: bisphenol A-type epoxy resin manufactured by Japan Epoxy Resins Co., Ltd.
jER1002: bisphenol A-type epoxy resin manufactured by Japan Epoxy Resins Co., Ltd.
<Amine Compound Having at Least One Sulfur Atom in its Molecule>
DDS: SEIKACURE (registered trademark)-S (diaminodiphenyl sulfone) manufactured by Wakayama Seika Kogyo Co., Ltd.
<Polyamide Compound Soluble in a Component>
Polyetheresteramide:
TPAE32 manufactured by Fuji Kasei Kogyo Co., Ltd.: mixture of compounds expressed by Formula 1. The averages of the symbols of Formulas 1 to 5 are X=Y=1, Z=7.26, a=0.16, b=0.84, l=2.23, α=10, β=34, d=2, m=14, n=1, γ=10, and e=4. Both $R_4$ and $R_4'$ are H. In addition, in TPAE32, both $PA_1$ and $PA_2$ have a state in which the structure of Formula 3 and the structure of Formula 4 are mixed.
TPAE12 manufactured by Fuji Kasei Kogyo Co., Ltd.,
In addition, when this mixture is heated and dissolved at 180° C. for 6 hours, the
A component is dissolved by 1 wt % or more.
<Urea Compound>
PDMU: phenyldimethyl urea (average diameter 50 μm)
DCMU: 3,4-dichlorophenyldimethyl urea
<Dicyandiamide>
DICY: dicyandiamide Example 1

[Epoxy Resin Composition]
The epoxy resin composition having the composition (mass ratio) of Table 1 was manufactured as follows.

First, an epoxy resin (jER828) and an amine compound (DDS) were mixed at room temperature and are then heated at 150° C. for 4 hours, thereby obtaining a reactive product. The viscosity of the reactive product at 90° C. was 87 Poise.

Next, a C component was dissolved in an A component at 120° C. in advance so as to obtain a mixture of the A component and the C component. In addition, the mixture of the A component and the C component, a B component, a D component and an E component were mixed at 60° C. until the composition ratio shown in Table 1 was uniform so as to obtain an epoxy resin composition. The viscosity and the gelling time of this epoxy resin composition were measured by the following method.

Next, this epoxy resin composition was inserted between glass plates with a spacer made of Teflon (registered trademark) and with a thickness of 2 mm, was cast, and was heated and cured at 130° C. for 1 hour, thereby obtaining a cured resin plate having a thickness 2 mm. With respect to the obtained resin plate, fracture toughness values GIc (critical strain energy release rates) and $KI_c$ (critical-stress-intensity factor) which are indicates of impact resistance were obtained by a SENB method described in ASTM D5045. Result is shown in Table 1.
(Measurement of Viscosity)
Using a 25-mmφ parallel plate, under the condition of a frequency of 10 Hz and distortion of 0.5%, complex viscosity coefficients η* of temperatures were while increasing the temperature from room temperature by 2° C. per minute using RDA-700 (manufactured by Rheometrics Inc.).
(Measurement of Gelling Time)
A suitable amount of epoxy resin composition was inserted between cover glasses and was left on a heater plate controlled at 130° C.±0.5° C. By repeating pressing the prepreg with tweezers, the state of the epoxy resin composition was confirmed and the time it takes for the gelling to be completed after leaving the epoxy resin composition was measured and was set as the gelling time. The completion of the gelling refers to a state in which deformation does not occur during pressing with tweezers, and the flow of the epoxy resin composition does not occur.
[Composite Panels and Fiber-Reinforced Tubular Composite (Shaft for Golf Club)]
Using the obtained epoxy resin composition as the matrix resin, prepreg was manufactured by the following method and the resin flow thereof was measured by the following method. Next, a composite was manufactured using this prepreg by the following method and 90° flexural strength and a glass transition temperature (Tg) were measured by the following method.

In addition, the golf club shaft was manufactured by the following method and torsional strength and izod impact strength were measured. Result is shown in Table 4.
(Manufacture of Prepreg)
The epoxy resin composition was uniformly coated on exfoliate paper by a simplified roll coater with mass per unit area of 49 g/m² so as to form a resin film. This resin film was bonded to both surfaces of a sheet-shaped material arranged uni-directionally such that the fiber unit area mass of a carbon fiber (TR50S, modulus of tensile modulus: 240 GPa) manufactured by Mitsubishi Rayon Co., Ltd. becomes 100 g/m², heating and pressing was performed by a roller at 100° C. with linear pressure of 2 kg/cm, and the epoxy resin composition was impregnated in a carbon fiber, thereby manufacturing prepreg with a fiber unit area mass of 100 g/m² (the content rate of the resin is 33 wt %).
(Measurement of Resin Flow)
The prepreg was cut by 100×100 mm such that one side is parallel with a direction in which the fiber is aligned, four plies were alternately laminated in an orthogonal manner to form a test piece, and the mass thereof was measured. Next, the test piece was inserted between both surfaces of subsidiary materials (one perforated FEP film, three glass fiber clothes (ECC 181 manufactured by Arisawa Manufacturing Co., Ltd.), and one Afron film) so as to form a lamination, this lamination was inserted into a hot press heated to 130° C., was pressurized to 13±0.5 kg/cm², and was held for 10 minutes.

The lamination was pulled out of the press, the subsidiary materials were peeled, and the overflowed resin was removed, the mass of the test piece was measured, thereby calculating a mass reduction rate before and after pressing (pressurization). The above-described operation was performed three times and the average value thereof was set as the value of the resin flow.

(Manufacture of Composite)

The prepreg was cut by 200×200 mm such that one side is parallel with a direction in which the fiber is aligned, and 20 layers of prepreg were laminated such that the thickness thereof becomes 2 mm, and were held in the hot press under three different conditions ((1) 130° C. for 60 minutes, (2) 140° C. for 5 minutes, and (3) 110° C. for 30 minutes), thereby manufacturing a flat-plate-shaped fiber-reinforced compositeplastic product (composite panel).

(90° Flexural Strength)

From this fiber-reinforced composite panel, a test piece was cut by the length of a side perpendicular to the direction in which the fiber is aligned 80 mm×width 12 mm and 90° flexural strength was measured based on ASTM D 790.

(Measurement of Glass Transition Temperature)

In addition, from this fiber-reinforced composite panel, a test piece was prepared by cutting the length of a side parallel to the direction in which the fiber is aligned 60 mm×width 12 mm. The temperature dependency of the storage modulus of the test piece was measured by applying shearing force at a velocity of 10 radian/second while increasing the temperature of this test piece by 5° C./STEP using a dynamic viscoelasticity measuring apparatus RDA-700 manufactured by Rheometrics Inc. Glass transition temperature (Tg) was obtained by an intersection point between a tangent line in a glass state region of the temperature dependency curve of the storage modulus and a tangent line in a transition region.

(Manufacture of Shaft for Golf Club)

The prepreg was cut by a predetermined size and a golf club shaft was manufactured by a sheet wrapping method of winding and laminating the prepreg on a mandrel.

Figure 2:
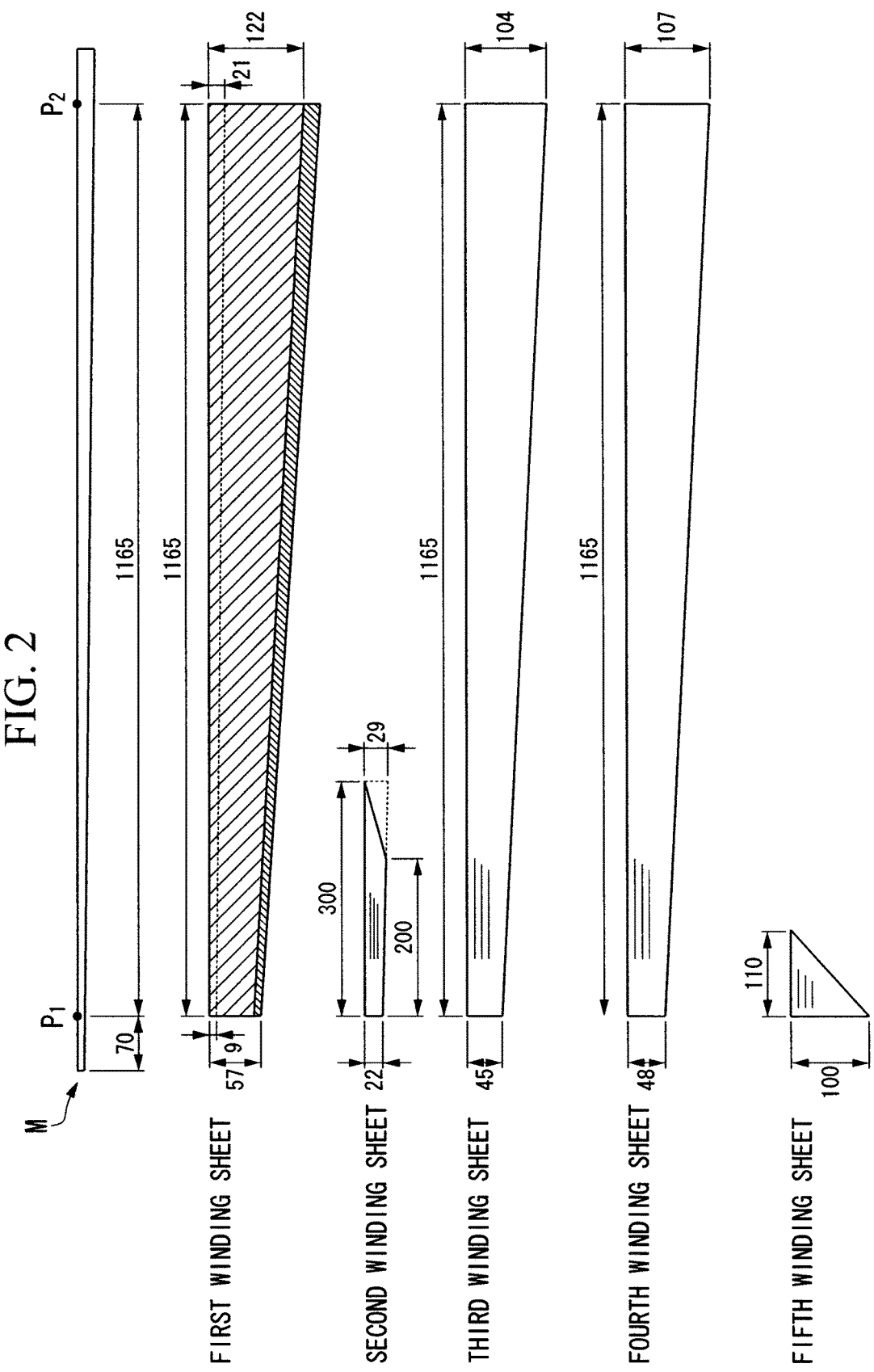
FIG. 2 is a plan view of prepreg used for manufacturing a golf club shaft.

The used mandrel M has a shape shown in FIG. 1 and the prepreg was cut in a shape shown in FIG. 2 and was wound on the mandrel.

In FIG. 1, $r_1$=5 mm$\varphi$, and $r_2$=13.5 mm$\varphi$. In addition, the overall length C of the mandrel is 1500 mm, A=1000 mm, and B=500 mm.

All the units of the values of FIG. 2 are [mm].

Two layers of prepreg were cut and were superposed so as to be deviated by 9 mm at the small diameter side of the mandrel and so as to be deviated by 21 mm at the large diameter side thereof as shown in FIG. 2 such that the carbon fiber alignment direction becomes +45° and −45° with respect to the length direction of the golf club shaft, thereby forming a first winding sheet, and the first winding sheet was wound on the mandrel.

With respect to a second winding sheet to a fifth winding sheet, the prepreg was cut and wound on the mandrel such that the alignment direction of the carbon fiber coincides with the axial direction of the length of the golf club shaft. Here, the first to fifth winding sheets were sequentially wound from a position $P_1$ of 70 mm from the small-diameter end (small-diameter front end) of the mandrel M to a position $P_2$ of 1235 mm from the small-diameter end. A polypropylene tape having a thickness 30 μm×a width 20 mm is wound thereon with a pitch of 2 mm so as to be tightened, and this was heated and cured at a temperature and for a time shown in Table 4.

Thereafter, the mandrel was pulled out, the polypropylene tape was peeled, and both ends of the mandrel were cut by 10 mm such that the length thereof becomes 1145 mm. Next, the surface of the mandrel was ground using a grinder so as to obtain the golf club shaft having the properties shown in Table 4.

(Measurement of Characteristics of Shaft for Golf Club)

The characteristics of the golf club shaft used in the examples and the comparative examples were measured by the following method.

(1) Measurement of Torsional Rigidity

Measurement was performed on the basis of a torsional test of the accreditation criterion and criterion confirmation method (Secretary of State for Trade and Industry No. 2087, Oct. 4, 1993) of the golf club shaft appropriated by Consumer Product Safety Association.

Using a 5 KN universal tester manufactured by Mechatronics Engineering, the small-diameter end of the golf club shaft was fixed, torque was applied to the large-diameter end, and torque when the shaft causes torsional rupture was set as the torsional rigidity.

(2) Izod Impact Test

Figure 3:
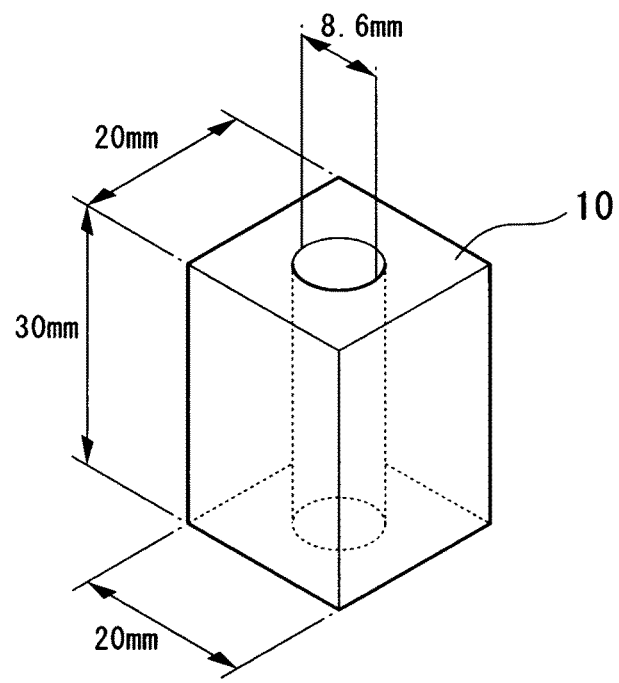
FIG. 3 is a perspective view showing a jig used in an Izod impact test.
Figure 4:
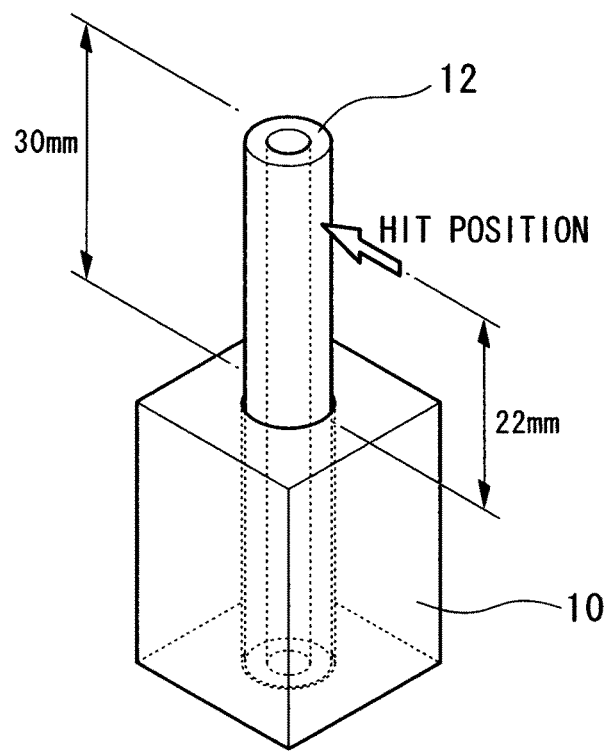
FIG. 4 is a perspective view showing the state of the Izod impact test.

Cutting was performed by a length of 60 mm from the small-diameter end of the golf club shaft to obtain an Izod impact test piece. The Izod impact test was measured using an Izod impact tester (dimension 29.4 N·m) manufactured by Ueshima Seisakusyo Co., Ltd. based on JIK K 7110. A jig 10 shown in FIG. 3 was fixed to the impact tester, a test piece 12 was inserted into the jig 10 by 30 mm as shown in FIG. 4, the test piece 12 was hit by a hammer at a position of 22 mm from the upper surface of the jig 10, and impact absorption energy was measured. In addition, the upper side (hit side) of the jig 10 is subjected to chamfering of 2R, and the gap of the jig 10 and the test piece 12 is not bonded. In addition, the test piece 12 is not notched.

(3) Natural Frequency

A weight of 196 g was mounted on the small-diameter end of the golf club shaft and a position to 180 mm from the large-diameter end (large-diameter front end) was fixed to a commercialized golf club timing harmonizer with air pressure of 300 KPa. A portion in which the weight is mounted was vibrated by hand and the natural frequency of the golf club shaft was measured.

(4) Torque (Torsional Angle)

A portion of 50 mm from the small-diameter end of the golf club shaft and a portion from 1035 mm to 1067 mm from the small-diameter end were fixed and the torsional angle when torque of 11 b·ft is loaded to the shaft was measured.

(5) Kick Point

Using a shaft kink point gauge (FG-105 RM, manufactured by FOURTEEN Co., Ltd.), the position of an apex curved when the golf club shaft is compressed from both ends thereof was measured as a distance from a small-diameter end, and a ratio thereof to an entire length was obtained.

(6) Center of Gravity

The length from the small-diameter end to the center of the golf club shaft was measured and a ratio thereof to an entire length was obtained.

Examples 2 to 9

Except for the compositions shown in Table 1 or Table 2, an epoxy resin composition and a cured resin plate were obtained similar to Example 1 and the same measurement thereof was performed. In Example 5, similar to Example 1, a prepreg, a composite panel and a golf club shaft were manufactured and the same measurement thereof was performed.

Example 10

An epoxy resin (jER828) used in a B component, an amine compound (DDS), and a C component (TPAE-32)

were mixed at room temperature and were heated to 150° C. so as to partially cause reaction, and manufacture was performed such that the viscosity at 90° C. becomes 30 to 90 Poise (similar to Example 1). The obtained reactive product, A component, D component, and E component were mixed at 60° C. until the composition ratio shown in Table 2 becomes uniform so as to obtain an epoxy resin composition. Similar to Example 1, a cured resin plate was obtained and the same measurement thereof was obtained.

Comparative Examples 1 to 19

Except for the composition shown in Table 1 to Table 3, an epoxy resin composition and a cured resin plate were obtained similar to Example 1 and the same measurement thereof was performed. In Comparative Example 1, Comparative Example 3, Comparative Example 4 and Comparative Example 9, similar to Example 1, a prepreg, a composite panel and a golf club shaft were manufactured and the same measurement thereof was performed.

Comparative Example 20

An epoxy resin (jER828) and a C component (TPAE-32) were heated to 150° C., were dissolved, and were cooled to room temperature. An amine compound (DDS), an A component, a C component, a D component, and an E component are mixed thereto at 60° C. until the composition ratio shown in Table 3 becomes uniform so as to obtain an epoxy resin composition. At this time, the epoxy resin (jER828) and the amine compound (DDS) do not substantially react to each other at 60° C. and the B component is not generated unlike the example. With respect to this epoxy resin composition, similar to Example 1, a cured resin plate was obtained and the same measurement thereof was performed.

As shown in Table 1 or Table 2, the gelling times of the epoxy resin compositions of Examples 1 to 10 at 130° C. were 200 seconds or less, and the resin plates which were the cured materials had a high value of fracture toughness of 500 J/m². As shown in Table 4, when the composites of Examples 1 and 5 are manufactured, curing was sufficiently performed under any curing condition and thus curing can be performed under the curing condition of a short period of time at low temperatures, such as (2) 140° C. for 5 minutes and (3) 110° C. for 30 minutes. The golf club shafts of Examples 1 and 5 had sufficient torsional strength and Izod impact strength.

In contrast, Comparative Examples 1 to 3 and 6 which did not include the C component had a low value for fracture toughness. In the Comparative Examples 2 to 3, the gelling time exceeded 200 seconds and curing property was inferior. In Comparative Example 1, the 90° flexural strength of the composite was low, and the torsional strength and the Izod impact strength of the golf club shaft were also lower than those of Examples 1 and 5.

In Comparative Example 4 which did not include both the B component and the C component, similar to Comparative Examples 2 to 3, the gelling time exceeded 200 seconds and the curing property was inferior. In Comparative Examples 5 and 17 which included the C component but did not include the B component, the value of fracture toughness was high, the gelling time exceeded 200 seconds, and the curing property was inferior.

In Comparative Examples 7 to 12 in which the other thermoplastic resins are mixed instead of the C component, the values for fracture toughness were low. In Comparative Examples 13 to 15 in which sulfur atoms or the C component is excessively included, the viscosity of the obtained resin composition was significantly high and the viscosity and the gelling time cannot be measured. Since the viscosity is significantly high and flowability is insufficient, the curing resin plate cannot be manufactured by casting.

In comparative Examples 16, 18 and 19 in which the C component is excessively included, the value of fracture toughness $G_{Ic}$ was 500 J/m² or more, and the gelling time was long and exceeded 200 seconds. Even in Comparative Example 20 in which the epoxy resin and the amine compound do not react to each other, the same tendency was shown. In Comparative Examples 3 and 4, Tg of the composite was low and the curing was insufficient under the curing condition of (2) 140° C. for 5 minutes and (3) 110° C. for 30 minutes. Accordingly, the cured material was very fragile and the 90° flexural strength could not be measured. In Comparative Example 4, the measurement of the glass transition temperature was also impossible. In Comparative Examples 3 and 4, since curing is not sufficiently performed under the curing condition of 130° C. for 30 minutes, curing was performed under the condition of 145° C. for 120 minutes in the manufacture of the golf club shaft.

TABLE 1

| Component | Product name | Example 1 | Example 2 | Example 3 | Example 4 | Example 5 | Comparative Example 1 | Comparative Example 2 | Comparative Example 3 | Comparative Example 4 | Comparative Example 5 |
|---|---|---|---|---|---|---|---|---|---|---|---|
| A | jER828 | 20 | 22 | 23 | 45 | 8 | 12 | 14 | 9 | 40 | 38 |
|  | jER807 |  |  |  |  |  |  |  |  |  |  |
|  | jER1002 | 25 | 25 | 20 |  |  |  |  |  | 52 | 46 |
| B | jER828 | 40 | 40 | 40 | 40 | 75 | 75 | 75 | 75 |  |  |
|  | jER807 |  |  |  |  |  |  |  |  |  |  |
|  | DDS | 3 | 3 | 3 | 3 | 5 | 5 | 5 | 10 |  |  |
| C | TPAE-32 | 4 | 2 | 6 | 4 | 4 |  |  |  |  | 4 |
|  | TPAE-12 |  |  |  |  |  |  |  |  |  |  |
| Thermosetting resin other than C component | PEI |  |  |  |  |  |  |  |  |  |  |
|  | BMI |  |  |  |  |  |  |  |  |  |  |
|  | PES |  |  |  |  |  |  |  |  |  |  |
|  | PI |  |  |  |  |  |  |  |  |  |  |
|  | PET |  |  |  |  |  |  |  |  |  |  |
|  | CTBN |  |  |  |  |  |  |  |  |  |  |
| D | PDMU | 3 | 3 | 3 | 3 | 3 | 3 |  |  |  |  |
|  | DCMU |  |  |  |  |  |  | 3 | 3 | 3 | 3 |
| E | DICY | 5 | 5 | 5 | 5 | 5 | 5 | 3 | 3 | 5 | 5 |
| Gelling time | (sec) | 190 | 180 | 190 | 180 | 170 | 190 | 230 | 210 | 240 | 250 |
| Content rate of sulfur | % | 0.4 | 0.4 | 0.4 | 0.4 | 0.6 | 0.6 | 0.6 | 1.3 | 0 | 0 |

TABLE 1-continued

| Component | Product name | Example 1 | Example 2 | Example 3 | Example 4 | Example 5 | Comparative Example 1 | Comparative Example 2 | Comparative Example 3 | Comparative Example 4 | Comparative Example 5 |
|---|---|---|---|---|---|---|---|---|---|---|---|
| C component rate | % | 4 | 2 | 6 | 4 | 4 | 0 | 0 | 0 | 0 | 4.2 |
| Viscosity | (Poise/90°) | 86 | 25 | 158 | 33 | 52 | 8 | 22 | 204 | 126 | 140 |
|  | (Poise/60°) | 1970 | 840 | 3650 | 425 | 524 | 220 | 620 | 5230 | 2180 | 2430 |
| GIc | (J/m$^2$) | 542 | 502 | 571 | 564 | 537 | 276 | 210 | 221 | 377 | 574 |
| KIc | (MPa√m) | 1.42 | 1.32 | 1.44 | 1.44 | 1.38 | 1 | 1.05 | 0.92 | 1.24 | 1.45 |

TABLE 2

| Component | Product name | Example 6 | Example 7 | Example 8 | Example 9 | Example 10 | Comparative Example 6 | Comparative Example 7 | Comparative Example 8 | Comparative Example 9 | Comparative Example 10 |
|---|---|---|---|---|---|---|---|---|---|---|---|
| A | jER828 | 37 | 22 |  |  | 8 | 24 | 20 | 20 | 20 | 20 |
|  | jER807 |  |  | 8 | 7 |  |  |  |  |  |  |
|  | jER1002 |  | 25 |  |  |  | 25 | 25 | 25 | 25 | 25 |
| B | jER828 | 40 | 40 |  |  | 73 | 40 | 40 | 40 | 40 | 40 |
|  | jER807 |  |  | 32 | 29 |  |  |  |  |  |  |
|  | DDS | 3 | 3 | 48 | 44 | 6 | 3 | 3 | 3 | 3 | 3 |
| C | TPAE-32 | 12 |  |  |  | 5 |  |  |  |  |  |
|  | TPAE-12 |  | 4 | 4 | 12 |  |  |  |  |  |  |
| Thermosetting resin other than C component | PEI |  |  |  |  |  |  | 4 |  |  |  |
|  | BMI |  |  |  |  |  |  |  | 4 |  |  |
|  | PES |  |  |  |  |  |  |  |  | 4 |  |
|  | PI |  |  |  |  |  |  |  |  |  | 4 |
|  | PET |  |  |  |  |  |  |  |  |  |  |
|  | CTBN |  |  |  |  |  |  |  |  |  |  |
| D | PDMU | 3 | 3 |  |  | 3 | 3 | 3 | 3 | 3 | 3 |
|  | DCMU |  |  | 3 | 3 |  |  |  |  |  |  |
| E | DICY | 5 | 5 | 5 | 5 | 5 | 5 | 5 | 5 | 5 | 5 |
| Gelling time | (sec) | 190 | 190 | 100 | 110 | 170 | 190 | 190 | 170 | 190 | 190 |
| Content rate of sulfur | % | 0.4 | 0.4 | 6.2 | 5.7 | 0.8 | 0.4 | 0.4 | 0.4 | 0.4 | 0.4 |
| C component rate | % | 12 | 3.9 | 4 | 12 | 5 | 0 | 4 | 4 | 4 | 4 |
| Viscosity | (Poise/90°) | 128 | 12 | 4350 | 21450 | 162 | 6 | 172 | 1940 | 1840 | 1663 |
|  | (Poise/60°) | 3255 | 440 | 57640 | 285470 | 3730 | 196 | 3825 | 25020 | 23130 | 19879 |
| GIc | (J/m$^2$) | 871 | 684 | 507 | 701 | 524 | 281 | 315 | 259 | 290 | 243 |
| KIc | (MPa√m) | 2.03 | 1.52 | 1.33 | 1.78 | 1.4 | 1.01 | 1.04 | 1.01 | 1.04 | 0.96 |

TABLE 3

| Component | Product name | Comparative Example 11 | Comparative Example 12 | Comparative Example 13 | Comparative Example 14 | Comparative Example 15 | Comparative Example 16 | Comparative Example 17 | Comparative Example 18 | Comparative Example 19 | Comparative Example 20 |
|---|---|---|---|---|---|---|---|---|---|---|---|
| A | jER828 | 20 | 20 |  |  |  | 51 | 40 | 72 | 60 | 20 |
|  | jER807 |  |  | 6 | 3 | 4 |  |  |  |  |  |
|  | jER1002 | 25 | 25 |  |  |  |  | 48 |  | 8 | 25 |
| B | jER828 | 40 | 40 |  |  |  |  |  |  |  | 40 |
|  | jER807 |  |  | 26 | 22 | 28 | 20 |  |  |  |  |
|  | DDS | 3 | 3 | 60 | 57 | 42 | 3 |  |  |  | 3 |
| C | TPAE-32 |  |  |  |  |  | 20 | 4 | 20 |  | 4 |
|  | TPAE-12 |  |  | 2 | 12 | 20 |  |  |  | 20 |  |
| Thermosetting resin other than C component | PEI |  |  |  |  |  |  |  |  |  |  |
|  | BMI |  |  |  |  |  |  |  |  |  |  |
|  | PES |  |  |  |  |  |  |  |  |  |  |
|  | PI |  |  |  |  |  |  |  |  |  |  |
|  | PET | 4 |  |  |  |  |  |  |  |  |  |
|  | CTBN |  | 4 |  |  |  |  |  |  |  |  |
| D | PDMU | 3 | 3 |  |  |  |  | 3 | 3 | 3 | 3 |
|  | DCMU |  |  | 3 | 3 | 3 | 3 |  |  |  |  |
| E | DICY | 5 | 5 | 3 | 3 | 3 | 3 | 5 | 5 | 5 | 5 |
| Gelling time | (sec) | 180 | 200 | Non-measurable | Non-measurable | Non-measurable | 210 | 260 | 250 | 270 | 220 |
| Content rate of sulfur | % | 0.4 | 0.4 | 7.7 | 7.4 | 5.4 | 0.4 | 0 | 0 | 0 | 0.4 |
| C component rate | % | 4 | 4 | 2 | 12 | 20 | 20 | 4 | 20 | 20.8 | 4 |

TABLE 3-continued

| Component | Product name | Comparative Example 11 | Comparative Example 12 | Comparative Example 13 | Comparative Example 14 | Comparative Example 15 | Comparative Example 16 | Comparative Example 17 | Comparative Example 18 | Comparative Example 19 | Comparative Example 20 |
|---|---|---|---|---|---|---|---|---|---|---|---|
| Viscosity | (Poise/90°) | 462 | 34 | Non-measurable | Non-measurable | Non-measurable | 2545 | 98 | 1416 | 782 | 23 |
| | (Poise/60°) | 9834 | 430 | Non-measurable | Non-measurable | Non-measurable | 29080 | 1452 | 15630 | 8920 | 670 |
| GIc | (J/m$^2$) | 231 | 288 | Non-measurable | Non-measurable | Non-measurable | 598 | 562 | 662 | 764 | 673 |
| KIc | (MPa√m) | 0.98 | 0.92 | Non-measurable | Non-measurable | Non-measurable | 1.83 | 1.49 | 1.52 | 1.71 | 1.66 |

TABLE 4

| | Component | Product name | Example 1 | Example 5 | Comparative Example 1 | Comparative Example 3 | Comparative Example 4 | Comparative Example 9 |
|---|---|---|---|---|---|---|---|---|
| Epoxy resin composition | A | jER828 | 20 | 8 | 12 | 40 | 38 | 20 |
| | | jER807 | | | | | | |
| | | jER1002 | 25 | | | 52 | 46 | 25 |
| | B | jER828 | 40 | 75 | 75 | | | 40 |
| | | DDS | 3 | 5 | 5 | | | 3 |
| | C | TPAE-32 | 4 | 4 | | | 4 | |
| | Thermosetting resin other than C | PES | | | | | | 4 |
| | D | PDMU | 3 | 3 | 3 | | | 3 |
| | | DCMU | | | | 3 | 3 | |
| | E | DICY | 5 | 5 | 5 | 5 | 5 | 5 |
| | Tg (° C.) | 130° C. × 60 min | 118 | 128 | 109 | 117 | 112 | 135 |
| | | 140° C. × 5 min | 116 | 127 | 113 | 72 | Non-measurable | 132 |
| | | 110° C. × 30 min | 119 | 127 | 95 | 71 | Non-measurable | 135 |
| Prepreg | Resin flow | (wt %) | 5.9 | 4.4 | 8.1 | 7.5 | 8.4 | 2.3 |
| Composite | 90° flexural strength (MPa) | 130° C. × 60 min | 118 | 125 | 109 | 128 | 112 | 130 |
| | | 140° C. × 5 min | 115 | 113 | 113 | Non-measurable | Non-measurable | 128 |
| | | 110° C. × 30 min | 130 | 122 | 95 | Non-measurable | Non-measurable | 134 |
| Golf club shaft | Hardening temperature (° C.) | | 130 | 130 | 130 | 145 | 145 | 130 |
| | Hardening time (min) | | 30 | 30 | 30 | 120 | 120 | 30 |
| | Izod impact strength (kgf · cm) | | 109 | 107 | 93 | 104 | 103 | 89 |
| | Torsional rigidity (kgf · cm) | | 2.41 | 2.19 | 2.03 | 2.35 | 2.43 | 1.99 |

INDUSTRIAL APPLICABILITY

According to the epoxy resin composition of the present invention, by completing curing in a short period of time even at low temperatures and using the epoxy resin composition as a matrix resin of the prepreg, it is possible to obtain a fiber-reinforced composite plastic product such as a fiber-reinforced tubular composite with excellent mechanical properties and, more particularly, excellent impact resistance. Accordingly, according to the present invention, it is possible to provide a composite with high productivity, high efficiency and excellent mechanical properties, for example, over the wide range from moldings used for sports and leisure goods such as a golf club shaft to moldings used for industrial products such as aircraft.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

The invention claimed is:
1. An epoxy resin composition, comprising:
an A component which is an epoxy resin;
a B component which is a reactive product of an epoxy resin, which is the same or different from the A component, and an amine compound comprising a sulfur atom;
a C component which is a block copolymer represented by formula (1) that is soluble in the A component;
a D component which is a urea compound; and
an E component which is a dicyandiamide,
wherein
a content of the sulfur atom is 0.2 wt % to 7 wt % relative to the epoxy resin composition,
a content of the C component is 1 wt % to 15 wt % relative to the epoxy resin composition, and
unreacted epoxy resin and/or unreacted amine compound may be present in the B component;

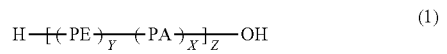

wherein
PE denotes a polyetherester skeleton,
PA denotes a polyamide skeleton and the polyamide skeleton is derived from a polymeric fatty acid, X=1 to 10,
Y=1 to 10, and
Z=1 to 20.

2. A prepreg, comprising:
the epoxy resin composition according to claim 1,
wherein the prepreg is impregnated in a reinforcement fiber.

3. A fiber-reinforced composite plastic product, comprising:
the prepreg according to claim 2.

4. A fiber-reinforced tubular composite, comprising:
the prepreg according to claim 2.

5. The fiber-reinforced tubular composite according to claim 4, wherein the fiber-reinforced tubular composite is a golf club shaft.

6. A method of manufacturing a fiber-reinforced tubular composite, the method comprising:
winding the prepreg according to claim 2 on a mandrel;
curing the epoxy resin composition in the prepreg; and
separating the cured epoxy resin from the mandrel, thereby obtaining a fiber-reinforced tubular composite, wherein
a temperature of the curing is 80 to 150° C., and
a length of the curing is 5 to 90 minutes.

7. The epoxy resin composition of claim 1, wherein the A component is an epoxy resin selected from the group consisting of bisphenol A epoxy resin, a bisphenol F-epoxy resin, a biphenyl epoxy resin, a dicyclopentadiene-type epoxy resin, a difunctional epoxy resin, a phenol novolak epoxy resin, a cresol epoxy resin, a glycidylamine epoxy resin, a triglycidyl aminophenol, a tetraglycidylamine, a glycidylether epoxy resin, and a combination thereof.

8. The epoxy resin composition of claim 1, wherein the A component is an epoxy resin selected from the group consisting of bisphenol A epoxy resin, the bisphenol F epoxy resin, a bisphenol S epoxy resin, a phenol novolak epoxy resin, a cresol novolak epoxy resin, and a combination thereof.

9. The epoxy resin composition of claim 1, wherein the amine compound is selected from the group consisting of 4,4'-diaminodiphenyl sulfone, 3,3'-diaminodiphenyl sulfone, 4,4'-diaminodiphenyl sulfide, bis(4-(4-aminophenoxy)phenyl) sulfone, bis(4-(3-aminophenoxy)phenyl) sulfone, 4'4-diaminodiphenyl sulfide, o-trian sulfone, and a combination thereof.

10. The epoxy resin composition of claim 1, wherein the block copolymer represented by formula (1) is a polyetheresteramide wherein X=Y=1, Z=7.26.

11. The epoxy resin composition of claim 1, wherein the urea compound is selected from the group consisting of dichlorodimethyl urea, a phenyldimethyl urea, and a combination thereof.

12. The epoxy resin composition of claim 1, wherein the content of the C component is 2 to 10 wt %.

13. The epoxy resin composition of claim 1, wherein the content of the C component is 2 to 6 wt %.

14. The epoxy resin composition of claim 1, wherein the content of the A component is 10 to 90 wt % relative to the epoxy resin composition.

15. The epoxy resin composition of claim 1, wherein the content of the A component is 30 to 90 wt % relative to the epoxy resin composition.

16. The epoxy resin composition of claim 1, wherein the content of the D component is 1 to 15 wt % relative to the epoxy resin composition.

17. The epoxy resin composition of claim 1, wherein the content of the E component is 0.1 to 10 wt % relative to the epoxy resin composition.

18. The epoxy resin composition of claim 1, wherein the A component is an epoxy resin selected from the group consisting of bisphenol A epoxy resin, the bisphenol F epoxy resin, a bisphenol S epoxy resin, a phenol novolak epoxy resin, a cresol novolak epoxy resin, and a combination thereof,
wherein the amine compound is selected from the group consisting of 4,4'-diaminodiphenyl sulfone, 3,3'-diaminodiphenyl sulfone, 4,4'-diaminodiphenyl sulfide, bis(4-(4-aminophenoxy)phenyl) sulfone, bis(4-(3-aminophenoxy)phenyl) sulfone, 4'4-diaminodiphenyl sulfide, o-trian sulfone, and a combination thereof,
wherein the block copolymer represented by formula (1) is a polyetheresteramide wherein X=Y=1, Z=7.26,
wherein the urea compound is selected from the group consisting of dichlorodimethyl urea, a phenyldimethyl urea, and a combination thereof,
wherein the content of the C component is 2 to 6 wt %,
wherein the content of the D component is 1 to 15 wt % relative to the epoxy resin composition, and
wherein the content of the E component is 0.1 to 10 wt % relative to the epoxy resin composition.

* * * * *